INVENTORS.
CHARLES E. KAUFMAN
WILLIAM H. TRAUTMAN

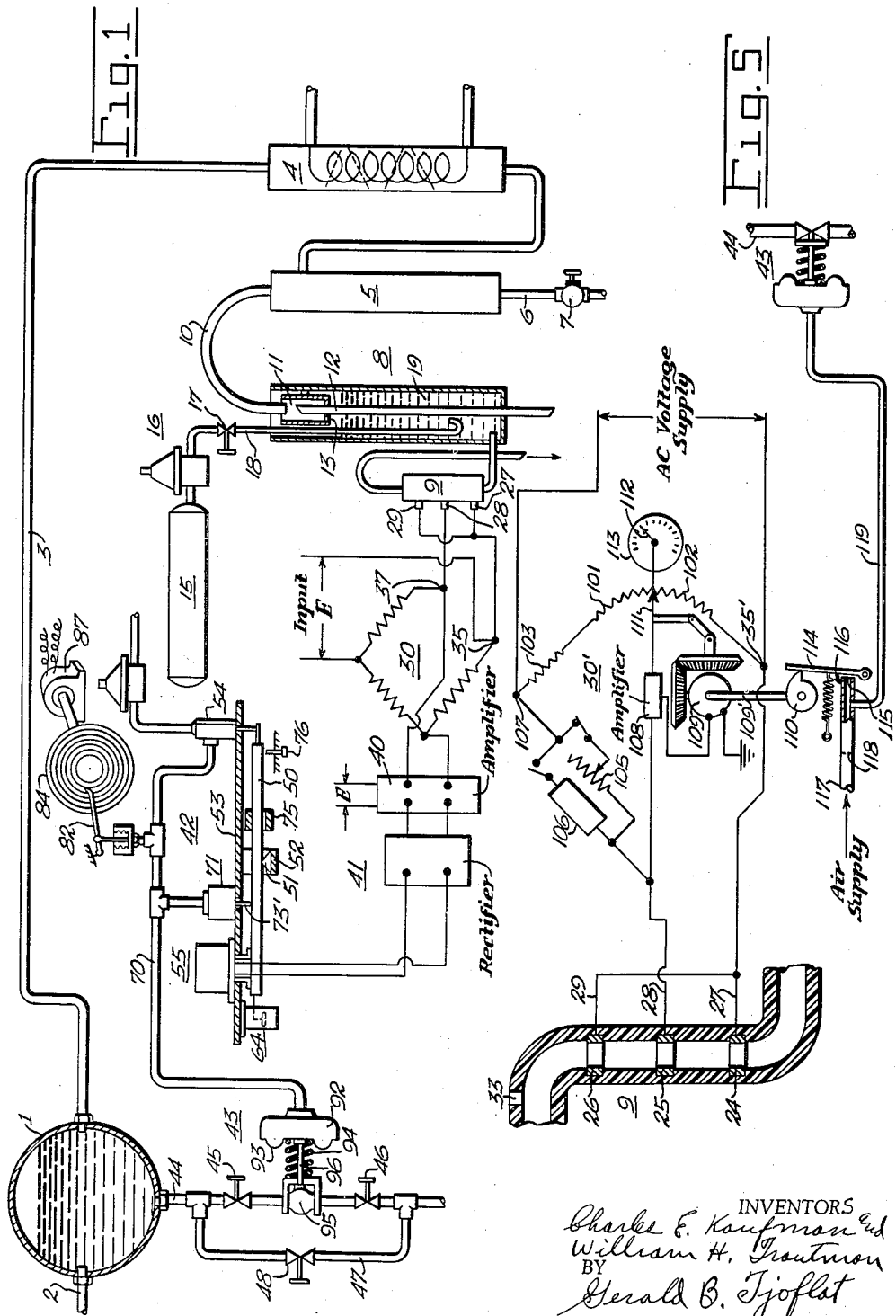

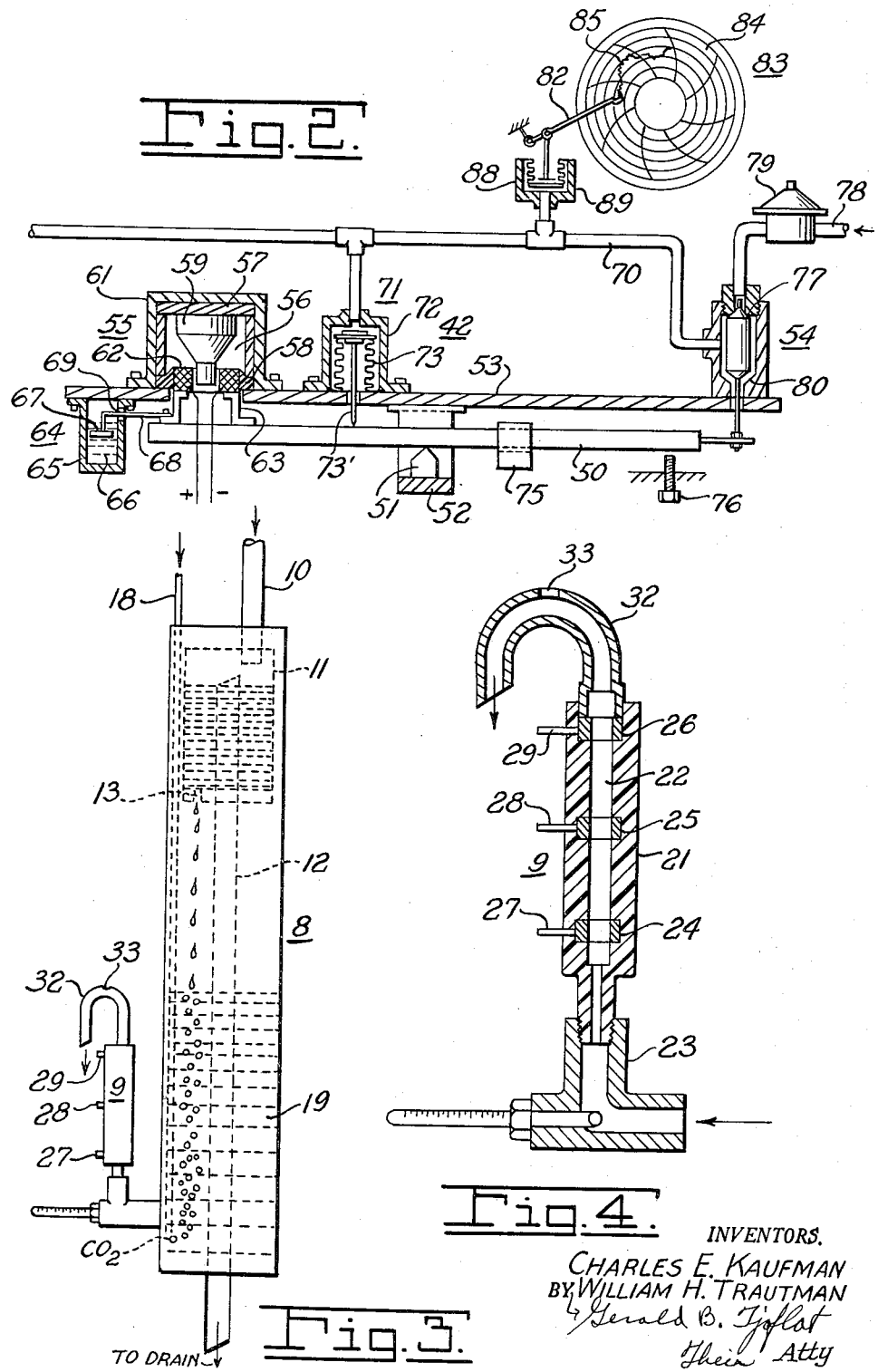

United States Patent Office 2,964,024
Patented Dec. 13, 1960

2,964,024

METHOD OF AND APPARATUS FOR CONTROLLING THE CONCENTRATION OF DISSOLVED SOLIDS IN STEAM BOILER WATERS

Charles E. Kaufman, Pleasant Hills, and William H. Trautman, Munhall, Pa., assignors to Hagan Chemicals & Controls, Inc., a corporation of Pennsylvania Filed Nov. 6, 1956, Ser. No. 620,656

8 Claims. (Cl. 122—382)

The invention relates to a method of and apparatus for controlling the concentration of dissolved solids in steam boiler waters and neutralizing a continuous sample of the boiler water by continuously adding a neutralizing agent thereto so as to provide a conductivity in the sample which is proportional to the dissolved solids concentration and from which the boiler blow-down can be regulated to maintain the dissolved solids concentration within desired limits.

In order that a conductivity reading may be indicative of dissolved solids content of a boiler water, the specific conductance of all the salts present must fall within a restricted range. Due to the influence of the hydroxyl ion, the specific conductance of sodium hydroxide and the alkaline salts sodium silicate and trisodium phosphate are considerably higher than the values of the two constituents sodium chloride and sodium sulfate normally found in major quantity in boiler waters. Carbon dioxide neutralization of the hydroxyl ion present as free alkalinity or associated with the alkaline salts, however, is found to bring their conductivities within an acceptable range. Table I infra shows how the average reduced alkaline conductivity of these salts falls halfway between the conductivity of sodium chloride and sodium sulfate. The fact that excess $CO_2$ produces no appreciable effect on conductivity under a pH of 8.5, makes it unnecessary to closely control the neutralization to a phenolphthalein end point.

An object of this invention is to provide a method whereby the dissolved solids of a steam boiler water may be determined by bubbling $CO_2$ into a sample of the boiler water at such a rate that the pH of the sample is reduced to a value below 8.3, the phenolphthalein end point. The method involves the measurement of the conductivity of the neutralized sample and so controlling the blow-down that the conductivity of the sample of the boiler water remains at a predetermined value or within a narrow range and is not distorted by alkaline materials.

A further object of the invention is to provide apparatus whereby a continuous sample of boiler water may be taken and that sample continuously neutralized with $CO_2$ gas, measuring the conductivity of the neutralized sample and controlling automatically the blow-down from the boiler at such rates as to maintain the conductivity at the predetermined set point or within a predetermined narrow range.

A still further object of the invention is to provide apparatus which is so arranged that if the conductivity falls below the set point value, the rate of blow-down is decreased until the conductivity increases and approaches the set point and then so regulating the blow-down that the conductivity of the continuously neutralized sample does not exceed the set point.

Other objects of the invention will be apparent to those of ordinary skill in the art to which the invention pertains from the following description taken in conjunction with the accompanying drawings.

In the drawings:

Figure 1 is a more or less diagrammatic view of apparatus for continuously sampling a steam boiler water, cooling the sample, separating the larger particles of suspended solids therefrom, and collecting a constant volume sample to which a neutralizing gas, such as $CO_2$ is continuously supplied, the apparatus including means for measuring the conductivity of the sample and so regulating the blow-down from the boiler that the conductivity of the neutralized sample is maintained within a predetermined range;

Fig. 2 is a more detailed view of a regulator that responds to the conductivity of the neutralized sample and develops a control force by which the blow-down is controlled;

Fig. 3 is a view in side elevation of a constant volume sampling device into which neutralizing $CO_2$ is bubbled, and a conductivity cell therefor;

Fig. 4 is a view in section of a conductivity cell embodied in the device of Fig. 3;

Fig. 5 is a more or less diagrammatic view of a modified form of conductivity response apparatus for measuring conductivity and automatically controlling blow-down;

Figure 6:
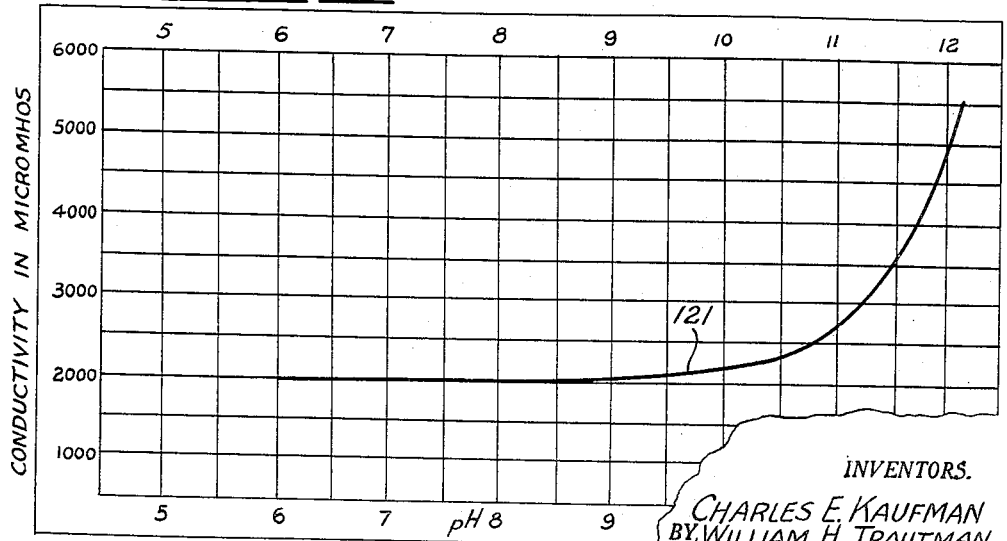

Fig. 6 is a graph showing the relationship between the conductivity in micromhos and the pH of a solution having an initial concentration of 905 p.p.m. of NaOH to which $CO_2$ gas was introduced in increments causing the pH to decrease due to neutralization according to the equation $NaOH+CO_2\rightarrow NaHCO_3$. It will be noted that below a pH of about 8.3 no change in conductivity occurs as $CO_2$ is added. This corresponds to the reaction:

$$H_2O+CO_2\rightarrow H_2CO_3$$

Since $H_2CO_3$ does not appreciably ionize, conductivity is not changed. Thus an excess of $CO_2$ is not harmful to the process.

Figure 7:
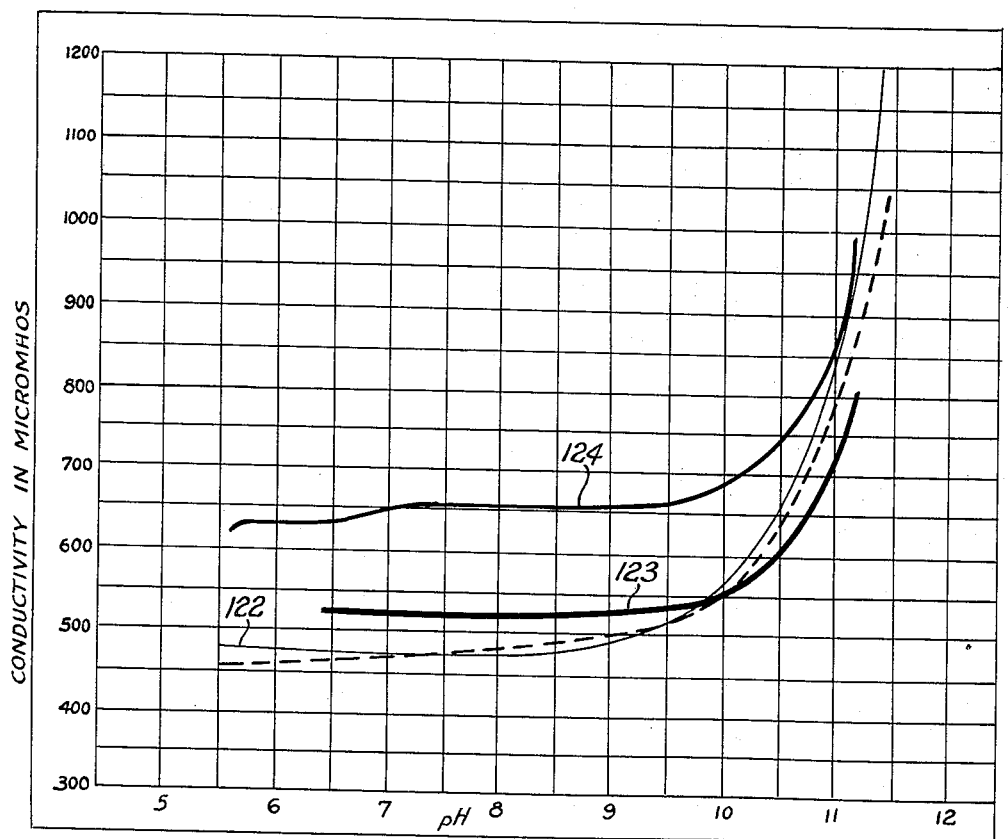

Fig. 7 is a graph showing the conductivity of solutions neutralized with $CO_2$ gas plotted against pH. Included are a solution containing 212 p.p.m. of NaOH (curve 122), a sodium silicate solution containing 320 p.p.m. $Na_2SiO_3$ (curve 123), and a solution initially containing 346 p.p.m. of sodium phosphate ($Na_3PO_4$) (curve 124).

In accordance with the method of the invention a steam boiler water sample is taken, cooled, large particles of suspended solids are separated and the cooled and separated sample is subjected to neutralization with a neutralizing agent such as carbon dioxide gas. The sample is neutralized with excess $CO_2$ to a pH lower than 8.3. If the conductivity of the neutralized sample is below the predetermined set point, this indicates that the concentration of dissolved solids in the boiler water is lower than necessary and consequently the blow-down from the boiler should be decreased. If the conductivity of the sample rises above the set point, the concentration of the dissolved solids is above what it should be and consequently the blow-down from the boiler is increased.

As stated supra, it has been found that the conductivity of a boiler water sample treated with an excess of $CO_2$ gas does not change appreciably below pH about 8.3 but above this value the conductivity rises rather sharply due to incomplete neutralization. Therefore, by neutralizing the boiler water sample with $CO_2$ so that the pH of the sample will lie at a value of about 8.3 or below, the dissolved solids in the boiler water may be controlled by conductometric methods within values acceptable to good boiler operation.

The method may be practiced by means of the apparatus schematically illustrated in Figures 1 or 5.

In Figure 1 the steam drum of a boiler is indicated at 1. Make-up water is supplied to the steam drum through a pipe 2 and a sample from the boiler water in the drum is taken continuously through a sampling pipe 3 to a heat exchanger 4 in which the sample is cooled. The cooled sample flows to a separator 5 in which the larger particles of suspended solids are separated. The suspended solids accumulating in the separator 5 may be removed as often as necessary through a pipe 6 in which is a valve 7.

The cooled and separated sample of boiler water flows to a vessel 8 with which is associated a conductivity cell 9. As shown, the vessel 8 comprises an open cylindrical chamber of substantial height compared to its diameter. The sample from the separator enters the upper end of the chamber through a pipe 10. That pipe discharges into a constant head receiver 11 having an overflow pipe 12 extending upwardly into the same to a point near the top thereof and downwardly through the bottom of the chamber where it discharges to drain as indicated.

In the bottom of the receiver 11 is an orifice 13 through which the boiler sample trickles or flows slowly into the lower portion of the vessel 8, where it accumulates as shown to a level controlled by the rate at which that water discharges through the conductivity cell 9.

The boiler sample in vessel 8 is neutralized by an agent such as $CO_2$ gas. The $CO_2$ is supplied by a tank or cylinder 15 provided with a pressure regulator 16 and throttling valve 17 leading to a pipe 18 that extends into the vessel 8 and downwardly into the water sample 19. The gas as shown, bubbles upwardly through that sample and reacts with the alkalinity to neutralize the same.

The conductivity cell 9 is shown more particularly in Figure 4. That cell comprises a body 21 of insulating material having a tubular or cylindrical bore 22 therein. The lower end of the body 21 is threaded into a fitting 23 which in turn is connected to the interior of the vessel or container 8 and in communication with the water sample 19. The body 21, as shown, is so disposed that the bore 22 is vertical. Within the bore 22 electrodes 24, 25 and 26 are disposed in substantially uniform spaced relation to each other. As shown, the interior surfaces of the electrodes 24, 25 and 26 are substantially flush with the wall of bore 22, so that the cell when dismantled may be easily cleaned by brushing.

The electrodes 24, 25 and 26 are provided with terminals 27, 28 and 29, respectively, by which the conductivity cell may be connected to and be made a part of a Wheatstone bridge 30. The upper end of the conductivity cell body 21 is provided with an overflow gooseneck 32 having an aperture 33 at the top thereof to prevent the formation of a vacuum which might interfere with the steady flow of neutralized boiler water sample through the cell.

As shown in Fig. 1, the terminals 27 and 29 of the cell are connected together and to an input terminal 35 of the bridge 30. The center electrode 25 has its terminal 28 connected to output terminal 37 of the bridge. Thus the conductivity cell forms one branch of the Wheatstone bridge.

The bridge 30 is supplied with an A.C. input voltage E as shown. The output voltage of the bridge is supplied to an amplifier 40 and its output is supplied to a rectifier 41. The rectifier 41 supplies its output to a regulator 42 for actuating a diaphragm operated valve 43 in the boiler water blow-down line 44. As shown, the blow-down line 44 is provided with shut off valves 45 and 46 on either side of the diaphragm operated valve and a by-pass 47 having a valve 48 therein, the by-pass being capable of by-passing valves 43, 45 and 46 if need be. Valves 45 and 46 may be adjusted to limit the maximum flow through the blow-down line. If desired, the by-pass 47 may be utilized to provide a fixed but continuous blow-down. In other words, the by-pass may be provided to maintain a constant continuous blow-down, leaving the control of the blow-down required to control the solids concentration to the diaphragm operated valve 43.

Regulator 42 is shown more in detail in Fig. 2 and comprises a beam 50 mounted on a knife edge or other anti-friction bearing 51, carried in a support 52 that is secured to a base 53. One end of the beam 50 operates an escapement valve 54 whereby a control pressure may be delivered to the diaphragm operated valve 43. The escapement valve 54 is capable of sending out a pressure, the magnitude of which may be within a range of from zero to 60 pounds gauge.

The regulator 42 also includes an input device 55 that is responsive to the output of the Wheatstone bridge 30. The receiving means 55 comprises a cylindrical member 56 of magnetic material which is closed at its upper end by a magnetic plate 57 and provided at its lower end with an annular pole piece 58 of magnetic material. Attached to the central portion of the plate 57 is a core 59 of a strong permanent magnetic material such as "Alnico."

The magnetic circuit comprising the member 56, the plate 57, the pole piece 58 and the core 59 is housed in an inverted cup-like member 61, having an annular flange at the bottom thereof which is secured to the base 53 by means of screws or other suitable means.

Within the pole piece 58 and operating in the air gap between the lower end of the core 59 and the pole piece is a coil winding 62. The coil winding is mounted on a support member 63 secured to beam 50. In order to stabilize motion of beam 50 with variations in the input to the coil 62, a dashpot 64 is provided. The dashpot comprises a container 65 secured to the underside of base 53 and containing a quantity of liquid such as oil 66. A loosely fitting piston 67 secured to an arm 68 carried by the beam 50 operates in the dashpot liquid. As shown, the arm 68 passes through an aperture 69 in the upper portion of the wall of the container or dashpot cylinder 65.

Input to the coil 62 causes the beam 50 to tilt clockwise with reference to Fig. 2. Such tilting of the beam actuates the valve 54 in a direction to deliver increasing pressure to an output or sending line 70 leading to the diaphragm operated valve 43.

In order that the valve 54 shall take a definite position for each value of input to the coil 62, a balancing device 71 is provided. That balancing device comprises a housing 72 having a bellows 73 therein, the lower end of which is secured as by brazing or welding to the lower end of the housing 72. A push rod 75 is secured at one end of the upper or closed end of the bellows while the opposite end engages beam 50 and exerts a turning force thereon that opposes and balances the turning force developed by coil 62.

In order that the beam may be balanced against the dead weight of the coil 62 and its supporting member and other components acting on the beam 50, a counterweight 75 is provided that may be moved towards or away from the righthand side of the fulcrum 51. Clockwise rotation of beam 50 is limited by an adjustable set screw 76′.

When valve 54 is in the position shown in Fig. 2, the inlet port 77 is closed. Therefore, the pressure supplied by a supply line 78 through a pressure regulating device 79 to the inlet is completely shut off and the pressure in pipe 70 is atmospheric, being open to the atmosphere through exhaust port 80. When the valve is in a position to completely close the exhaust port 80 and fully open the inlet port 77, the pressure supplied to line 70 will be equal to the pressure of the air supply at the inlet port 77. When the valve is between these extreme positions the values of the pressures delivered to the sending line 70 will be proportional to the relative throttling of the inlet and exhaust ports, respectively.

The pressure established in pipe 70 may be utilized to actuate a pen arm 82 of a recording meter 83 having a chart 84 on which a curve 85 is traced to indicate and record the values of the conductivity of the boiler water sample in the sampling device 8. The chart will therefore indicate whether or not the blow-down rate has been adjusted as required.

The chart 84, as shown in Fig. 1, may be driven by a constant speed motor 87. The pen arm 82 may be positioned in accordance with the pressure in pipe 70 by means of a pressure deflectable member, such as a bellows 88, disposed in a housing or chamber 89 to which the pressure from pipe 70 is delivered.

The diaphragm operated valve 43 as schematically illustrated in Fig. 1 comprises a housing 92 having a diaphragm 93 which is acted upon by the pressure delivered by pipe 70. The force developed by the pressure on the diaphragm is resisted by a spring 94 so that the diaphragm will take a definite position for each value of pressure. The diaphragm 93 operates a valve 95, the valve stem 96 of which is connected to the diaphragm as shown.

In Fig. 5 a modified form of Wheatstone bridge and controls responsive thereto, for regulating the blow-down valve 43, are shown. The cell 9 constitutes one arm of the bridge which includes in its other branches a balancing resistor 102, a resistor 103, a manually adjustable temperature-compensating resistor 105. An automatic temperature-compensator 106 may be substituted for resistor 105.

The power input to the bridge is A.C. voltage impressed on terminals 35' and 107. The output from the bridge passes through an amplifier 108 and controls the movement of a reversing motor 109 which in turn drives a shaft 109'. The shaft 109' drives a cam 110, a sliding contact arm 111 that engages the balancing resistor 102 and an arm 112 of a conductivity indicator 113.

Cam 110 operates a baffle 114 that controls the escape of air under pressure from a nozzle 115 of a nozzle body 116. Air is supplied to the body 116 by a constant pressure supply pipe 117 in which is an orifice 118. The body 116 is connected by a pipe 119 to blow-down valve 43.

The pressure in pipe 119 varies with the pressure drop across orifice 118. That drop varies with the position of baffle 114 relative to the tip of nozzle 115. When the baffle closes the nozzle, the pressure in pipe 119 is a maximum and when removed a maximum distance from the nozzle tip, the pressure in pipe 119 is a minimum because of the pressure drop across the orifice 118. For intermediate positions of the baffle, the value of pressure established in pipe 119 will lie between the maximum and minimum values.

In order to obtain pertinent facts connected with the control of blow-down of steam boiler water in accordance with this invention, studies were conducted in the laboratory to obtain data on conductivity vs. pH for NaOH, $Na_2SiO_3$, and $Na_3PO_4$ solutions when neutralized with gaseous $CO_2$. As seen by the curves 122, 123 and 124 of Fig. 7, the conductivity of the alkaline solutions decreased with the introduction of $CO_2$ until a pH of 9.5 was reached. Between a pH of 9.5 and 8.5 the curves begin to level off finally becoming horizontal below a pH of 8.5. The fact that excess $CO_2$ showed no appreciable effect on conductivity below this 8.5 pH makes a closely controlled neutralization just to the phenolphthalein end point unnecessary. An excess of $CO_2$ is necessary but the amount of the excess is not critical.

In order to utilize conductivity measurements as a means of determining the dissolved solids content of a boiler water, it is necessary to reduce the influence of various alkaline constituents present in the water so that conductivity values will be more indicative of actual salt concentrations. It is equally important that the conductivity-concentration ratios between the said alkaline constituents not only be of equivalent magnitude but that they fall within the conductivity range of the two major components—sodium chloride (NaCl) and sodium sulfate ($Na_2SO_4$)—normally present in boiler water. With carbon dioxide ($CO_2$) neutralization, the average reduced alkaline conductivity is found to fall halfway between the conductivities of sodium chloride and sodium sulfate, which are unchanged by neutralization. Table I shows the effect of neutralization on conductivity of these boiler water salts.

Boiler water samples from various plants were analyzed; conductivity before and after neutralization with $CO_2$ was measured, and the reduction of conductivity following neutralization of hydroxide (OH), silica ($SiO_2$) and phosphate ($PO_4$) was also computed. Table II infra shows the good comparison found between the calculated and the observed reduction of two such samples.

On Fig. 7, curve 123, decrease of conductivity is plotted as $CO_2$ is added to decrease pH. Table III infra shows this same data in tabular form together with corresponding conductivities based on calculation. Calculation was based on the known weight ratios of $OH/CO_3/HCO_3$ at various pH values. Since the ratios are known, the actual relative amounts of OH, $CO_3$ and $HCO_3$ can be estimated and the corresponding conductivities calculated from the literature values. The dotted line on Fig. 7 shows the calculated values. It is readily observed how the conductivity of the products of neutralization varies considerably from the initial free alkalinity associated with the hydroxyl ion. The individual conductivities were totaled and compared with the observed conductivity. The agreement was close.

Data collected when using a neutralizing chamber as shown indicated that a 50-pound tank of $CO_2$ would last 50 days when furnishing sufficient $CO_2$ to neutralize boiler water having an alkalinity equivalent to 320 p.p.m. of sodium hydroxide at a flow of 230 ml./min. This rate of $CO_2$ is equivalent to four times that theoretically required for the neutralization of the alkalinity. Calculations are shown in Table IV.

TABLE I

*Conductivity of $CO_2$ neutralized and unneutralized boiler water constituents*

| Compound | P.p.m. | Conductivity in Micromhos Equivalent to 1 p.p.m. | | |
|---|---|---|---|---|
| | | Unneutralized | Neutralized | |
| NaCl | 200 | 2.10 | 2.10 | 2.10 |
| NaOH | 212 | 5.62 | 2.26 | |
| $Na_2SiO_3$ | 320 | 2.54 | 1.63 | Average 1.87 |
| $Na_3PO_4$ | 346 | 2.84 | 1.89 | |
| $Na_2CO_3$ | 281 | 3.56 | 1.71 | |
| $Na_2SO_4$ | 200 | 1.65 | 1.65 | |
| $Na_2SO_4$ | 1,000 | 1.50 | 1.50 | 1.50 |

TABLE II

*Measured decrease in conductivity of boiler water as a result of neutralization compared to decrease calculated from single component solution values*

[FROM EXPERIMENTAL DATA ON SINGLE COMPONENT SOLUTIONS]

| Alkaline Constituent | Conductivity—Micromhos | | Decrease in Conductivity Due to Neutralization Micromhos |
|---|---|---|---|
| | Unneutralized at pH 11.8 | Neutralized at pH 8.3 | |
| 212 p.p.m. $OH^-$ | 1,200 | 480 | 720 |
| 200 p.p.m. $SiO_2^-$ | 800 | 520 | 280 |
| 200 p.p.m. $PO_4^-$ | 900 | 650 | 250 |

Analysis of two boiler water samples showing the amount of various components present and the measured change in conductivity with neutralization.

|  | Analysis of Boiler Water A Sampled May 5 | Analysis of Boiler Water B Sampled May 15 |
|---|---|---|
|  | pH 11.8— p.p.m. | pH 11.7— p.p.m. |
| Hydroxide (OH)⁻ | 288 | 288 |
| Sulfite (SO₃)⁻ | 5 | 0 |
| Sulfate (SO₄)⁻ | 725 | 750 |
| Chloride (Cl)⁻ | 35 | 40 |
| Nitrate (NO₃)⁻ | 25 | 15 |
| Phosphate (PO₄)⁻ | 70 | 65 |
| Silicate (SiO₂)⁻ | 40 | 35 |

|  | Micromhos | Micromhos |
|---|---|---|
| Conductivity measurements: |  |  |
| Before neutralization | 3,670 | 3,770 |
| After neutralization | 2,340 | 2,620 |
| Decrease in Conductivity | 1,330 | 1,150 |

Calculated decrease in conductivity of the two boiler water samples when applying the experimental data for single component solutions to the alkaline constituents present.

| Boiler Water A | | | Boiler Water B | | |
|---|---|---|---|---|---|
| Alkaline Constituent | p.p.m. | Calculated Decrease in Conductivity, micromhos | Alkaline Constituent | p.p.m. | Calculated Decrease in Conductivity, micromhos |
| OH⁻ | 288 | ∴ 720×$\frac{288}{212}$= 980 | OH⁻ | 288 | ∴ 720×$\frac{288}{212}$= 980 |
| SiO₂⁻ | 40 | ∴ 280×$\frac{40}{200}$= 56 | SiO₂⁻ | 35 | ∴ 280×$\frac{35}{200}$= 49 |
| PO₄⁻ | 70 | ∴ 250×$\frac{70}{200}$×⅓= 29 | PO₄⁻ | 65 | ∴ 250×$\frac{65}{200}$×⅓= 27 |
|  |  | 1,065 |  |  | 1,056 |

COMPARISON

|  | Boiler Water A (micromhos) | Boiler Water B (micromhos) |
|---|---|---|
| Measured conductivity change | 1,330 | 1,150 |
| Calculated conductivity change | 1,065 | 1,056 |

TABLE III

*Distribution of conductivity of NaOH solution at various stages of neutralization with CO₂ gas*

[FOR 212 P.P.M. NaOH—CONDUCTIVITY (MICROMHOS)]

| Conductivity Contributed by Ions | | | | Total Calculated | Total Observed |
|---|---|---|---|---|---|
| pH | OH | CO₃ | HCO₃ | | |
| 11.4 | 960 | 100 | | 1,060 | 1,200 |
| 10.2 | | 540 | 30 | 570 | 580 |
| 9.6 | | 310 | 230 | 540 | 520 |
| 9.05 | | 140 | 365 | 505 | 495 |
| 7.4 | | | 475 | 475 | 475 |
| 6.76 | | | 475 | 475 | 475 |
| 6.50 | | | 475 | 475 | 473 |
| 6.30 | | | 475 | 475 | 473 |
| 6.10 | | | 475 | 475 | 475 |
| 5.72 | | | 460 | 460 | 478 |
| 5.50 | | | 480 | 480 | 480 |
| 5.48 | | | 460 | 460 | 480 |

Conductivities of ions obtained from: MacInnes, Duncan A., The Principles of Electrochemistry, Reinhold, N.Y., 1939, p. 342.

TABLE IV

*Carbon dioxide consumption*

Sample flow—230 ml./minute.
Alkalinity in Sample equivalent to 320 p.p.m. NaOH or 0.320 gram NaOH/liter of sample.

Alkalinity to be neutralized $\frac{230}{1000}$×0.320=0.074 gram NaOH/minute.

Neutralization equation
$$\underset{40}{NaOH} + \underset{44}{CO_2} \xrightarrow{\phantom{X}} NaHCO_3$$
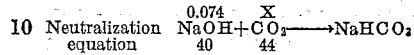

According to above equation, the amount of carbon dioxide (CO₂) required for neutralization or X is 0.081 gram CO₂/minute.

Amount of CO₂ theoretically required per day 0.081 gm./min.×60 min./hr.×24 hr./day=117 gm. or 0.257 lb. CO₂/day.

A 50-lb. CO₂ tank would theoretically last 194 days.

In actual practice with excess CO₂ desired and incomplete reaction it was found that 0.04 lb./hr. of CO₂ was used to neutralize an alkalinity equivalent to 320 p.p.m. NaOH. With this rate of consumption a 50-lb. tank of CO₂ would last 50 days.

OPERATION

The system shown in Fig. 1 of the drawings for controlling blow-down from a boiler so as to maintain the solids concentration in the boiler water at a desirable value operates as follows:

A continuous unneutralized sample of boiler water is taken from boiler 1 and conducted by pipe 3 to the cooler 4 from which it passes to the separator or settler 5. The gross or coarse solid particles settle to the bottom of the separator 5 from which they are removed from time to time through the valve 7. The unneutralized water sample containing the dissolved solids then flows to the neutralizer 8. The water sample is neutralized by bubbling CO₂ gas through it as shown. The rate of flow of CO₂ gas to the neutralizer is adjusted to a value that brings the pH of the sample to at least the phenolphthalein end point. CO₂ gas is an ideal neutralizer because an excess thereof does not of itself affect the conductivity of the sample. Excessive amounts of CO₂ gas beyond that required to neutralize the alkalinity of the sample may therefore be used, although it is wasteful to do so.

The neutralized sample flows through the conductivity cell 9 which is a part of the Wheatstone bridge 30. If it be assumed that the bridge 30 has been adjusted to balanced condition at the value of dissolved solids to be maintained in the boiler, the output of the bridge is zero. That value of the dissolved solids may be considered as the control point.

If the dissolved solids in the continuous sample increase, the conductivity increases, which means that the resistance of the branch of the Wheatstone bridge represented by the conductivity cell 9, has decreased thereby causing the bridge to unbalance. That unbalance appears as voltage at the output terminals of the bridge, which voltage is applied as input to the amplifier 40. The input voltage is A.C., as is the output voltage of the amplifier. The output of the amplifier is rectified by a rectifier 41. The D.C. output of the rectifier is supplied to the input winding 62 of regulator 42. As stated supra, increasing current to the winding 62 causes the regulator to transmit increased pressure through pipe 70 to the diaphragm 93 whereby the opening in the valve 95 is increased, thereby increasing the blow-down and reducing the concentration of solids in the boiler water through dilution with the feed water which must be increased to replace that lost by blow-down. As the solids concentration in the sample at the conductivity cell decreases, the resistance of that branch of the Wheatstone bridge represented by the sample in the cell, increases. When the bridge is again in balance, the blow-down effected by the regulator 42 and the valve 95 will have been reduced to the control point value of dissolved solids.

If the dissolved solids concentration in the boiler water sample at the conductivity cell 9 decreases below the control point, the resistance of the branch of bridge 30, as represented by the water sample in the conductivity cell, increases and the bridge is unbalanced in a direction to reduce the input to the winding 62 of regulator 42. That reduced input produces a reduced output pressure from the regulator valve 54, which in turn reduces the pressure on the diaphragm 93 whereby valve 95 is moved towards closed position, thereby reducing the rate of blow-down from the boiler. Thus, the blow-down rate is modulated by so increasing or decreasing it that the dissolved solids in the boiler water are maintained at the control point.

The system of Fig. 5 operates to produce the same results as the system of Fig. 1. In Fig. 5, unbalance of the Wheatstone bridge 30' effects operation of the motor 109. That motor rebalances the bridge as well as controlling the flap 114 that controls the operating pressure for the diaphragm operated blow-down valve 43, as described supra.

Having thus described the invention, it will be apparent to those of ordinary skill in the art to which the invention pertains that various modications and changes may be made in the disclosed embodiment of the method and of the apparatus.

Therefore, what is claimed as new and desired to be secured by Letters Patent is:

1. A method of controlling the salt concentration of boiler water containing dissolved basic salts which yield an appreciably higher specific conductivity than that attributable to the presence of sodium chloride and sodium sulfate in like proportions which consists in continuously sampling the boiler water at a fixed rate, supplying feed water to the boiler water at a rate sufficient to maintain an operating level in the boiler, continuously passing $CO_2$ gas through the sample at a rate sufficient to neutralize the hydroxyl ion content thereof and reduce the pH of the sample to a value within a range in which the higher pH value of the range does not exceed substantially a pH corresponding to the phenolphthalein end point, continuously measuring the conductivity of the neutralized sample and blowing down water from the boiler at such a rate that the conductivity of the neutralized sample is maintained substantially constant at a predetermined low value indicative of a low salt concentration.

2. A method according to claim 1 in which the blow-down of water is so regulated as to keep the conductivity of the boiler water sample at a value that lies between the conductivities of NaCl and $Na_2SO_4$ solutions of substantially the same concentration as the concentration of the dissolved basic salts in the sample.

3. A method as in claim 1 in which the sample, prior to neutralization, is cooled to a substantially constant temperature, and suspended solids, at least in part, are removed from the sample.

4. A method of controlling the salt concentration of boiler water containing dissolved basic salts which yield an appreciably higher specific conductivity than that attributable to the presence of sodium chloride and sodium sulfate in like proportions, which consists in taking a continuous sample of water from the boiler at a predetermined rate, substantially eliminating the conductivity effect of the hydroxyl ion concentration in the sample by continuously passing $CO_2$ gas through the sample at such a rate that the conductivity of the sample is rendered substantially proportional to the concentration of the dissolved salts therein, measuring the conductivity of the sample, and regulating the blow-down from the boiler at such a rate that the conductivity of the neutralized sample is maintained substantially constant at a desired low value.

5. A method as in claim 4 in which the sample, prior to neutralization, is cooled to a substantially constant temperature, and suspended solids, at least in part, are removed from the sample.

6. Apparatus for automatically controlling the blow-down of water containing dissolved basic salts, and suspended solids, from a steam boiler to thereby regulate the dissolved salts concentration therein, said apparatus comprising means for blowing-down water from the boiler, means for continuously withdrawing sample water from the boiler, means for cooling the sample withdrawn, means for separating suspended solids from the sample, means for receiving the separated sample, means for collecting a portion of the sample at a predetermined volumetric rate, means for bubbling $CO_2$ gas through the collected sample at such a rate as to neutralize the hydroxyl ion concentration in the sample, means for measuring the conductivity of the collected sample, and means responsive to said conductivity for so regulating the blow-down means that the blow-down is increased as the conductivity increases above a set point value and decreasing the blow-down as the conductivity decreases below said value, whereby the conductivity of the sample is maintained at substantially the set point value.

7. Apparatus according to claim 6 in which the means for collecting said portion of the sample comprises a vessel having therein a fixed volume receiving container into which the sample discharges, an overflow for said receiving container for limiting the volume of sample therein to a fixed value, said receiving container having an orifice through which the sample flows into the lower portion of the vessel at a fixed rate, the vessel having an outlet for supplying sample to the conductivity measuring means.

8. Apparatus according to claim 6 in which the conductivity means comprises a hollow member having an inlet connected to the sample collecting means and an outlet and a plurality of electrodes spaced along said hollow member and the blow-down control means is responsive to the change in conductivity of the portion sample located between said electrodes.

References Cited in the file of this patent

UNITED STATES PATENTS

| | | |
|---|---|---|
| 1,684,645 | Smith et al. | Sept. 18, 1928 |
| 1,944,803 | Ornstein | Jan. 23, 1934 |
| 1,971,816 | Hecht | Aug. 28, 1934 |
| 2,396,934 | Wallace | Mar. 19, 1946 |